United States Patent [19]

Taylor

[11] Patent Number: 4,598,742
[45] Date of Patent: Jul. 8, 1986

[54] METHOD AND APPARATUS FOR MONITORING LIQUID STOCK IN A STORAGE TANK

[75] Inventor: Paul R. Taylor, Market Harborough, England

[73] Assignee: Dover Corporation, New York, N.Y.

[21] Appl. No.: 794,598

[22] Filed: Nov. 4, 1985

Related U.S. Application Data

[63] Continuation of Ser. No. 572,742, Jan. 23, 1984, abandoned.

[30] Foreign Application Priority Data

Apr. 14, 1983 [GB] United Kingdom ............... 8310096

[51] Int. Cl.$^4$ .................... B65B 1/48; G01F 23/26; G01N 15/06
[52] U.S. Cl. ......................................... 141/95; 141/1; 141/83; 250/577; 73/327; 364/509
[58] Field of Search ............... 141/1, 392, 98, 94, 141/95, 83; 250/577; 73/327, 293; 364/509, 478, 479

[56] References Cited

U.S. PATENT DOCUMENTS

| | | | |
|---|---|---|---|
| 1,123,227 | 10/1914 | Heim et al. | 250/577 X |
| 3,120,125 | 2/1964 | Vasel | 250/577 X |
| 3,864,577 | 2/1975 | Pellett et al. | 250/577 |
| 3,882,887 | 5/1975 | Rekai | 137/386 |
| 4,134,022 | 1/1979 | Jacobsen | 250/577 |
| 4,156,149 | 5/1979 | Vaccari | 250/577 |
| 4,179,623 | 12/1979 | Jacobsen | 250/573 |
| 4,246,489 | 1/1981 | Yoshida et al. | 250/577 |
| 4,296,472 | 10/1981 | Sarkis | 364/509 |
| 4,306,525 | 12/1981 | Faxvog | 73/293 X |
| 4,349,882 | 9/1982 | Asmundsson et al. | 364/509 |
| 4,354,180 | 10/1982 | Harding | 250/577 X |
| 4,396,411 | 8/1983 | Motsinger et al. | 73/293 X |
| 4,397,183 | 8/1983 | Ballou et al. | 73/293 |
| 4,481,595 | 11/1984 | Schiessel et al. | 73/293 |

FOREIGN PATENT DOCUMENTS

1549827 8/1979 United Kingdom .

*Primary Examiner*—Stephen Marcus
*Assistant Examiner*—Ernest G. Cusick
*Attorney, Agent, or Firm*—Wood, Herron & Evans

[57] ABSTRACT

Method and apparatus for monitoring liquid stock in a storage tank. A prism connected by optical fibers is located at a fixed position in a tank, the volume of liquid at the fixed position being determined. A computer receives data relating to the liquid dispensed, and the liquid received, and calculates an amount of liquid in the tank at the moment the liquid passes the fixed prism. The calculated data is compared to the exact volume data received from the prism.

7 Claims, 6 Drawing Figures

MAIN PROGRAM

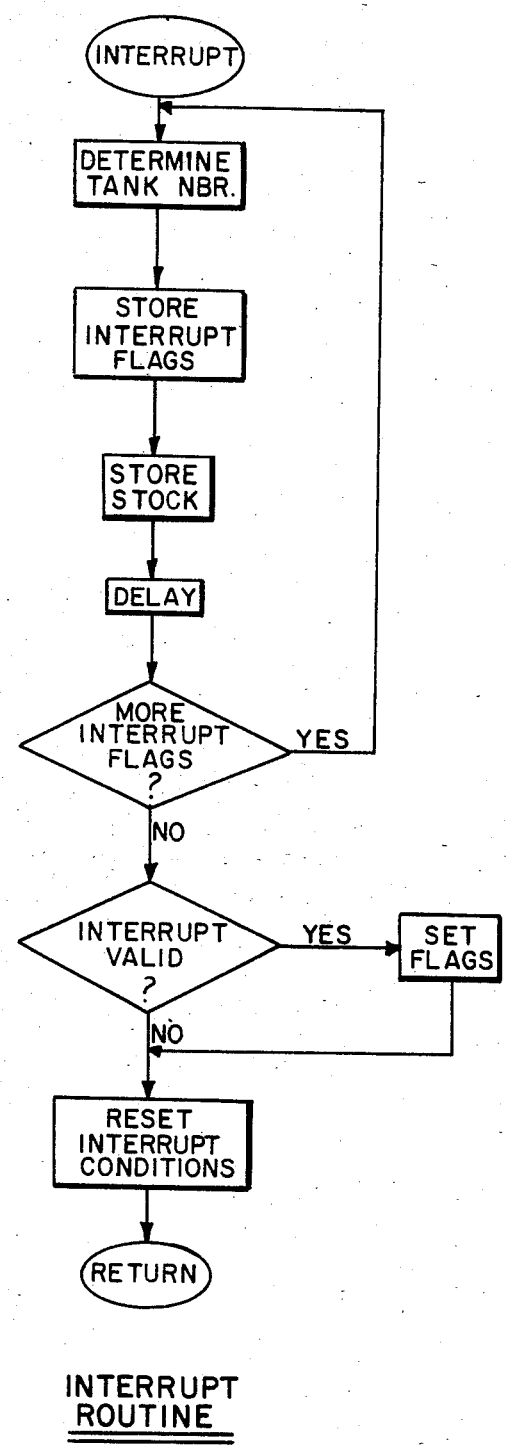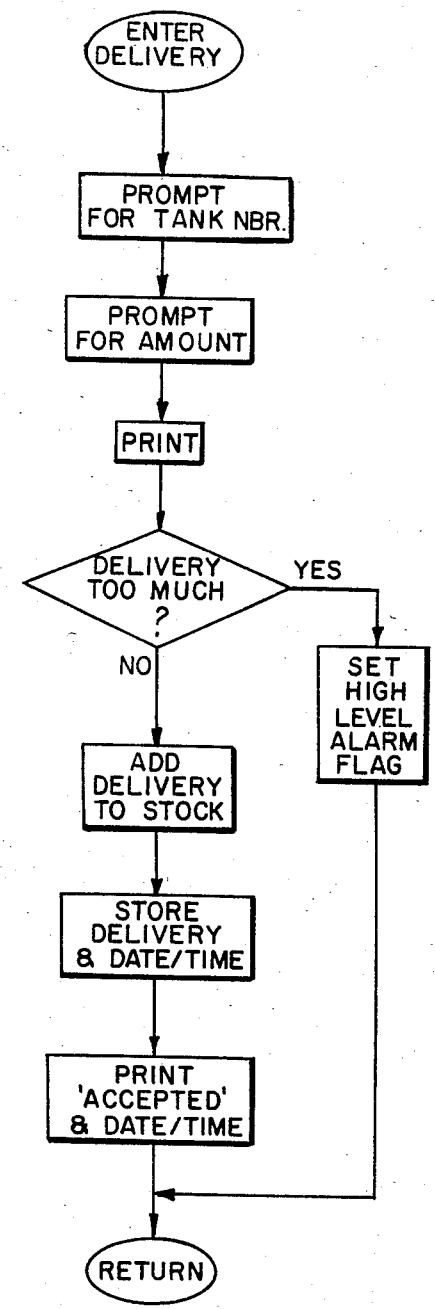
INTERRUPT ROUTINE
FIGURE 4
DELIVERY
FIGURE 5

REPORT

METHOD AND APPARATUS FOR MONITORING LIQUID STOCK IN A STORAGE TANK

This application is a continuation, of application Ser. No. 572,742, filed Jan. 23, 1984, now abandoned.

This invention relates to a method and apparatus for monitoring liquid stock, and more particularly, the invention is directed to the monitoring of gasoline in a service station storage tank. In gasoline service station operations, it is known to employ a computer connected to gasoline dispensers to record the gasoline dispensed, to record the gasoline added to the storage tank from time to time, and using that data, to calculate the tank inventory. That calculated inventory provides, at best, only an approximation of the actual stock in the tank. It provides, for example, no indication of leakage, pilfering and the like.

It is also known to provide gauging apparatus having devices for periodically or continuously monitoring the volume of gasoline in the tank. Of these monitoring devices, the convention dip stick is by far the most widely used. These gauging devices are not particularly accurate, the best having an error of about 0.5%. Furthermore, they likewise do not provide an indication of leakage, pilfering or other aberrations which might occur in the movement of the liquid stock.

It has been an objective of the present invention to provide an improved monitoring system, and more particularly, to provide a monitoring system which is useful in detecting leakage, pilferage and the like.

This objective of the invention is attained by comparing calculated stock to a premeasured value of stock at the moment that the level of the stock passes the point at which its premeasured value is ascertained. A comparison of these values will produce a variance. That variance by itself may be of some value. However, when a series of such comparisons are made over a period of time such as a month, trends will appear which will be very useful to the service station operation.

It is not important that the volume of gasoline at the fixed level be precisely known within a fraction of a gallon. Rather, it is important to know precisely when the level of gasoline passes that fixed point.

More particularly, the invention calls for the fixing of an indicator in the tank at a level which is known. In the preferred embodiment, a prism is mounted at a fixed position in the tank and is connected by optical fibers to a light source and a receiver in a manner disclosed in British Pat. No. 1,549,827. The gasoline level detected by that apparatus is accurate to 0.020". Placed in the middle of a 10,000 gallon tank, it is accurate to 0.7 gallons. The output of the level-detecting apparatus is connected to a computer. That computer is provided with data from the gasoline dispensers as well as "gasoline delivered" data from which a calculated volume of gasoline can be ascertained. The computer is coupled to the level detector and is programmed to compare the calculated volume at the instant the level of the gasoline in the tank passes the indicator prism with the actual gasoline volume at this level.

Preferably, the computer stores the date, the time, the variance of the calculated volume of gasoline from the true volume, and the variance in the form of a percentage relative to gasoline dispensed since the previous comparison.

Under average conditions of service station operation, this comparison will be made a number of times per month and will provide useful information which heretofore has been unavailable. For example, if there is an ever increasing variance in a linear pattern, it is likely that gasoline is leaking from the tank. If there are large but sporadic disappearances of gasoline, possibly pilfering is indicated.

Another feature of the invention has been to provide a level-detecting prism disposed and set in the tank with its base being substantially horizontal although slightly inclined so that liquid flows off the base as the liquid in the tank descends.

The several features of the invention will become more readily apparent when taken in conjunction with the accompanying drawings, in which:

FIG. 4 is an illustrative flow chart of the interrupt routine for the computer of FIG. 2;

FIG. 5 is an illustrative flow chart of a subroutine for entering "gasoline delivered" into the computer of FIG. 2.

Figure 1:
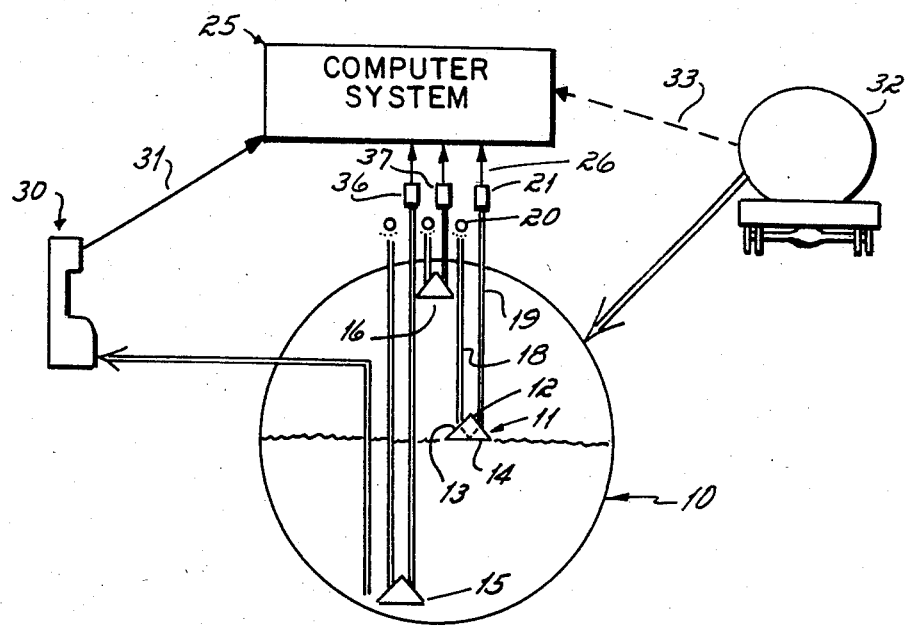
FIG. 1 is a diagrammatic illustration of the system of the invention applied at a service station.

A service station usually has at least three tanks 10, one being illustrated in FIG. 1, to store the different types of gasoline such as leaded gasoline, unleaded regular, and unleaded supreme. Within each tank 10 is at least one indicator 11 which in the preferred form of the invention is a prism having two inclined faces 12 and 13 and a base 14. The base 14 is substantially horizontal, although it is preferably slightly inclined so that gasoline will flow off the surface of the base as a level in the tank is lowered.

The tank can have more than one indicator. For example, an indicator 15 is located near the bottom of the tank to provide a signal that the tank is almost empty. An indicator 16 is provided at the top of the tank to provide a warning signal during the filling of the tank that the level of the gasoline has reached the top of the tank.

Still further, a tank might have an indicator every one-fourth millimeter of vertical height to provide something approaching a continuous measurement of the volume in the tank.

Each prism has an optical fiber 18 attached to a surface 13 and an optical fiber 19 attached to the surface 12. A light source 20 is located adjacent the fiber 18 and a photocell 21 is located adjacent the fiber 19. Light rays from the source 20 are transmitted to the prism via the optical fiber 18 and are normally reflected off the base 14 to the surface 12. The optical fiber 19 returns the light rays from the surface 12 to the photocell 21. When the surface 14 becomes immersed in a liquid, the index of refraction of the liquid is so close to that of the prism that reflection no longer takes place and thus the prism acts as a switch to switch the light transmission on or off depending upon whether the prism is uncovered or immersed in liquid.

A computer arrangement 25, the function of which will subsequently be described, is connected to the photocell 21 by a line 26. Each of the prisms 15, 16 is also coupled to the computer arrangement 25 via photocells 36, 37 and illuminated by light sources through optical fibers, as in the case of the prism 11. The prism 11 is located in the tank in a fixed position and the volume of the gasoline in the tank at that level is measured. When the liquid level descends to the exact point of uncovering the base 14, the signal sent to the computer via the optical fiber 19 and the connection 26 is that of the premeasured level or volume of gasoline in the tank.

The service station has the usual gasoline "pumps," or dispensers 30 whose information relating to the quantity of gasoline dispensed is fed to the computer by the connection 31.

Gasoline in the tank 10 is received from a tank truck 32. The quantity of gasoline in the tank truck is known. In the United States, it is the practice to measure the quantity of gasoline in the truck at the time the truck is filled. That quantity of gasoline will be dispensed from the truck into the tank 10. That quantity of gasoline fed to the tank is entered into the computer, that entry being diagrammatically illustrated by the line 33.

In the operation of the system, over a period of days deliveries will be made to the tanks and liquid will be dispensed from the dispensers 30. For example, the liquid level in the tank could descend past the prism 14 about twenty times per month. At the precise moment that the liquid passes the base 20 of the prism, the light from the source 20 is reflected to the photocell 21 producing a signal coupled to the computer, and the computer thus receives a true indication of the volume of stock in the tank at that moment. This should be accurate to within a fraction of a gallon or liter. Simultaneously, the computer reads the theoretical, or calculated, value of gasoline volume in the tank which has been determined by adding the fuel introduced and subtracting the fuel dispensed from the previous true value established the last time the gasoline descended past the prism base 14. The variance between the actual volume and the calculated volume is computed as well as that variance as a percentage of gasoline dispensed since the previous comparison. All of the computed information is stored.

At any time, the service station operator will be able to obtain a printout of that stored information, such as the last twenty entries, for example. That printout might appear as follows:

STOCK DEVIATION ANALYSIS
ON TANKS IN GARAGE FORECOURT

| DAY | TANK 1 24,000 L 4 STAR | | TANK 2 30,000 L 4 STAR | | TANK 3 24,000 L 2 STAR | |
| --- | --- | --- | --- | --- | --- | --- |
| | LITERS | % | LITERS | % | LITERS | % |
| 1 | 26 | .11 | 70 | .23 | 150 | .62 |
| 3 | +13 | .05 | 35 | .12 | 180 | .75 |
| 5 | 46 | .19 | +54 | +.10 | 126 | .53 |
| 7 | 53 | .22 | 24 | .08 | 149 | .62 |
| 10 | 80 | .33 | 15 | .05 | 98 | .41 |
| 13 | 72 | .30 | +62 | +.21 | 139 | .58 |
| 18 | 24 | .10 | 3 | .01 | 173 | .72 |
| 22 | 69 | .29 | 10 | .03 | 126 | .53 |
| 25 | 40 | .17 | 17 | .06 | 187 | .78 |
| 29 | 162 | .67 | +180 | +.60 | 176 | .73 |
| 31 | 73 | .30 | 60 | .20 | 184 | .77 |
| AV: | | .23 | | +.01 | | .64 |

Tank 1 and Tank 2 - Possible split load day 29
Tank 3 - Possible leak.
Tank 2 - Insignificant stock gain but variation indicates erratic deliveries.

In the illustrated printout, the % variance has been expressed as a % of tank capacity, and the gasoline volume has been expressed in liters. It should be understood that the variance can be expressed as a percent of throughput or any other activity indicator over a preselected period of time.

As significant errors do not arise in the measurement of the volume of the fuel in the tank by the fiber optic probe, devications between the theoretical and true stock values will represent real gains and losses from known sources.

This information can be quite useful to the operator. For example, in tank 2 there is insignificant stock gain, but the variation indicates erratic deliveries. There may possibly be a problem with the amount of gasoline delivered from the tank truck. Tank 3 shows a relatively high amount of deviation compared to the other tanks, the deviation being substantially uniform. Possibly the pump is delivering more than is transmitted to the computer, or there may be a possible leak.

Figure 2:
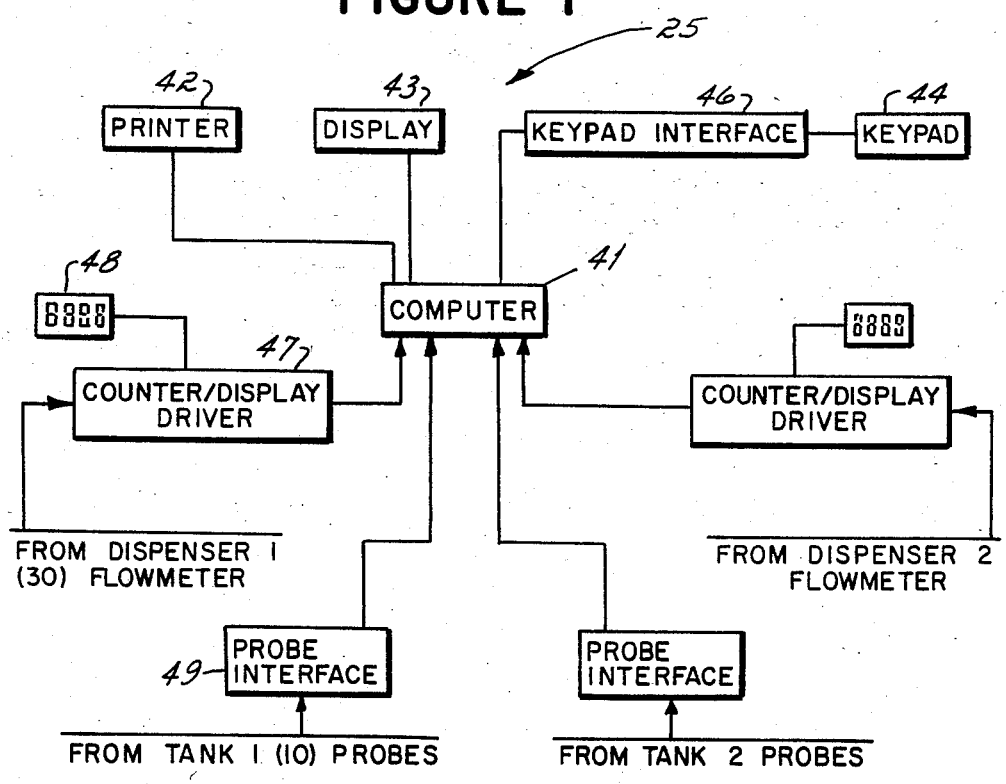
FIG. 2 is a block diagram of the computer arrangement in the system of FIG. 1.

A preferred form of computer arrangement 25 for generating the reports and analyses includes a computer 41 (FIG. 2) coupled to a printer 42, a display 43, and a key pad 44 via a key pad interface circuit 46. In the illustrated embodiment, the computer 41 is a Rockwell 65/40 single board computer (sbc). The printer 42 and the display 43 are "intelligent", each including an sbc. As shall be described, data such as gasoline delivery volumes can be entered through the key pad 44 in response to prompts from the computer 41 on the display 43. The reports and analyses are produced on printer 42.

Within the practical limits of operational speed of the computer 41, various numbers of tanks and dispensers can be monitored by the computer. As indicated earlier, there may be three tanks and three dispensers, one for each of three different types of gasoline. It is also possible that more than one dispenser may be provided for a single tank. In the form of the invention illustrated in FIG. 2, there are two gasoline tanks, tank No. 1 and tank No. 2, each having a single associated dispenser. Tank No. 1 may be regarded as the tank 10 of FIG. 1 and the dispenser No. 1 may be regarded as the dispenser 30 of FIG. 1. The dispenser No. 2 and the tank No. 2 are substantially the same as the dispenser 30 and the tank 10, with its associated level indicators. Since the tanks and dispensers are substantially the same, the operative connections for only the tank 10 and the dispenser 30 shall be described in detail.

The dispenser 30 includes a flow meter for measuring the amount of gasoline dispensed, such as into the gas tank of an automobile. The dispenser 30 typically includes a numeric display of the amount of gasoline dispensed, which is derived from the output of the flow meter. The flow meter output is also coupled to a counter/display driver 47 which drives a display 48 also showing the amount of gasoline dispensed. This display 48 is typically at the location of the computer 41, such as inside a service station for the convenience of the service station operator in monitoring the amount of gasoline dispensed at the dispenser 30. In the case of a dispenser 30 having a digital display, it is possible to utilize the electrical signals driving the digital display at the dispenser 30 for the display driver 47, and the counter portion thereof may be omitted. As shall be described, the computer 41 cumulates the amounts of gasoline dispensed for subsequent calculations, but the display 48 is, of course, reset each time a customer dispenses gasoline from the dispenser 30.

The outputs from the probes 11, 15 and 16 in the tank 10 are also coupled to the computer 41 via a probe interface circuit 49. The probe interface circuit 49 converts the absence or presence of light at the photocells 21 into gasoline level signals usable by the computer 41. In the operation of the computer system 25, the computer 41 is responsive to the gasoline level in a tank reaching the high level sensor 16 or the gasoline level falling to the level of either the switch point sensor 11 or the low level sensor 15. The computer 41 also, for each tank, cumulates the amounts of gasoline dispensed from the tank and the amounts of gasoline added to the tank, as input to the computer via the key pad 44.

Figure 3:
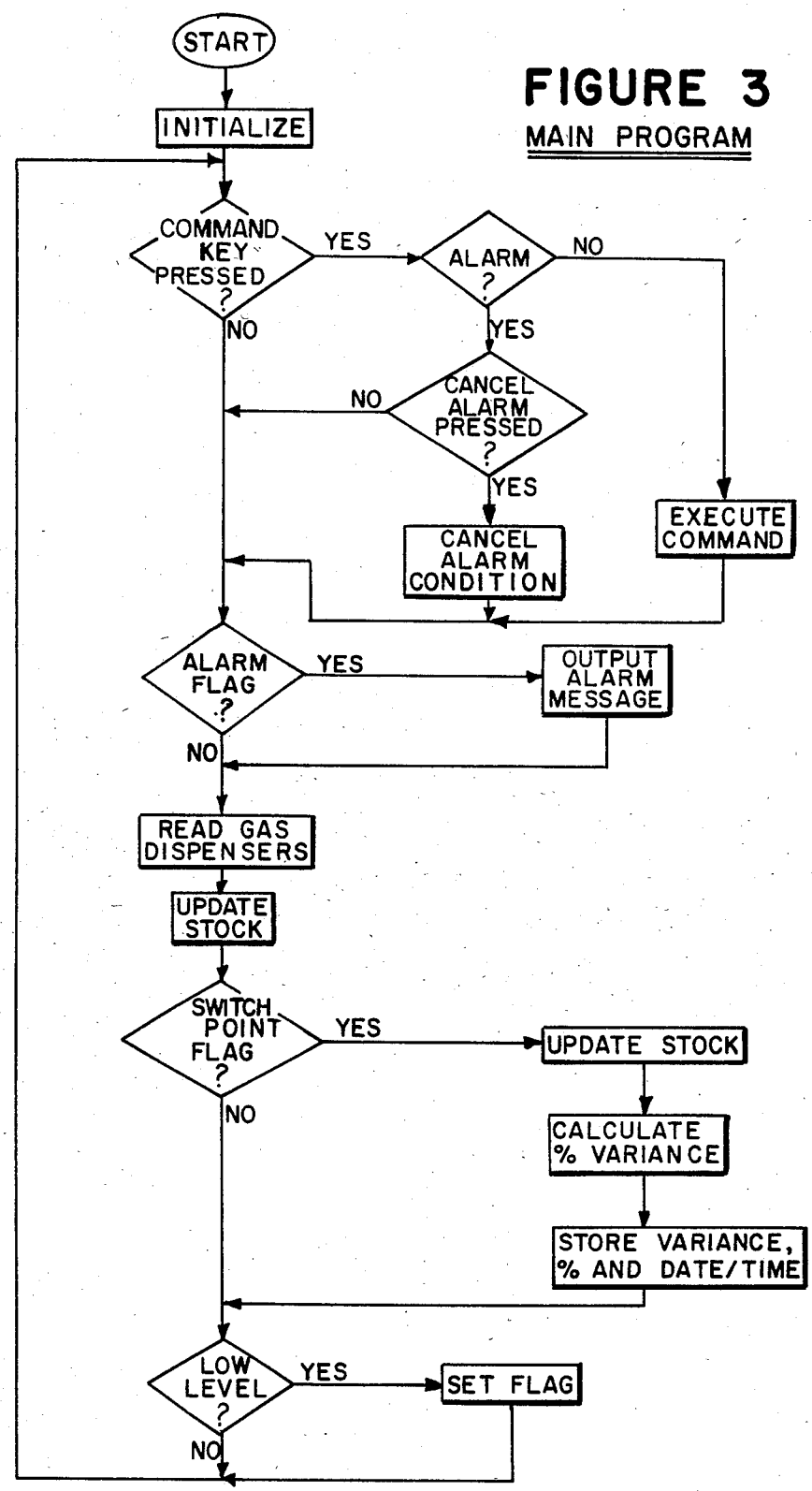
FIG. 3 is an illustrative flow chart of the main program of the computer of FIG. 2.

The computer 41 operates under the control of a main program, an interrupt routine initiated by a high or switch point level sensor signal, and a number of subroutines executed in response to operator key pad entries. With reference to FIG. 3, upon power-up, the computer 41 starts the execution of the main program by initializing variables, interface conditions, and interrupts. The computer then determines if a command key in the keyboard matrix has been depressed. If not, the computer then determines if an alarm flag has been set. In the present instance, a flag is a high or low gasoline level indication from a sensor in one of the tanks. If no alarm flag is set, the computer reads the gasoline dispensers and updates the calculated gasoline stock value for each tank.

The computer then determines if a switch point flag has been set, indicative of the gasoline level in a tank being at the switch point sensor 14. If a switch point flag is not set, the computer checks for a low level indication from one of the low level sensors 15. If there is a low level condition in one of the tanks, the appropriate low level flag is set within the computer 41. After checking for a low gasoline level, the computer then loops to the first step after initialization, that of determining if a command key has been depressed. The computer then continues to execute this loop, scanning the key pad, checking for an alarm flag, reading the dispenser counters, and checking for switch point flags set.

If an alarm flag is set, indicative of a high or low gasoline level alarm condition for a tank, this is detected by the computer in the main program loop, and the computer outputs an appropriate alarm message. This message is output on the display 43, and may be accompanied by an audible signal and a printout at the printer 42.

The low level alarm flag is set in the execution of the main program, as described above. In order to set a high level alarm flag or a switch point flag, the interrupt routine of FIG. 4 is executed. This routine is initiated in response to the gasoline level in a tank reaching the level of a high level sensor 16 or falling to the level of a switch point sensor 14.

When an interrupt condition arises, the computer first determines at which tank or tanks any interrupts have occurred. The computer stores the interrupt flags, which have been set in response to level indicator outputs from the sensors 14, 16. The computer then stores the present stock value for each tank at which an interrupt has occurred. The computer next waits for a delay interval to assure that a true level signal has been received rather than a noise input. If during the delay interval more interrupt flags are set, the delay loop is executed again. The computer then determines if the one or more interrupt conditions are valid. For example, a high level and a switch point level indication from the same tank would be an invalid interrupt condition. For any valid interrupts, the computer sets the appropriate high level or switch point level flags and resets the interrupt conditions. The computer then returns to the main program and resumes program execution at the point at which it was interrupted.

If a high level alarm flag has been set in the interrupt routine, an appropriate output alarm message is produced as the computer executes the main program loop. If a switch point flag has been set in the interrupt routine, the computer updates the gasoline stock value for that tank to equal the known volume for the tank when the switch point level sensor 14 is uncovered. The computer then uses the stock value stored during the interrupt routine to calculate the variance between the calculated gasoline volume and the actual gasoline volume. The variance is stored in the computer 41 together with the date and time, for subsequent inclusion in a printed variance report. The computer also stores the stock variance expressed as a percentage of the total gasoline dispensed from the tank since the last switch point condition. In the present instance, this data is stored in a circular buffer containing twenty separate entries. A new entry over-writes the oldest entry giving a sequential historical record of the last twenty, for example, stock variances.

When a command key is pressed, the designated command is executed by the computer 41. If an alarm condition exists, the computer determines if a "cancel alarm" key has been pressed. If so, the computer cancels the alarm condition. If a high or low level alarm condition exists, the computer will only accept a "cancel alarm" command. If an alarm condition does not exist, the computer executes the selected command, which may be thought of as a subroutine, and returns to the main loop.

As illustrated in FIG. 5, if an "enter delivery" command is entered at the key pad 44, the computer prompts the operator through the display 43 to enter the number of the tank to which the delivery was made. After the tank number is entered, the computer prompts for the volume of the delivery. The computer then prints the amount of the delivery and determines if the delivery amount is such that, when added to the gasoline in stock in the tank, the high level for the tank will be exceeded. If so the computer sets the high level alarm flag and returns to the main program loop.

If the delivery is not too large, the computer adds the delivery amount to the stock total for the tank. The computer then stores the amount of the delivery and the date and the time of the delivery. The computer then prints "accepted" and the date and the time via the printer 42 and returns to the main program loop.

Figure 6:
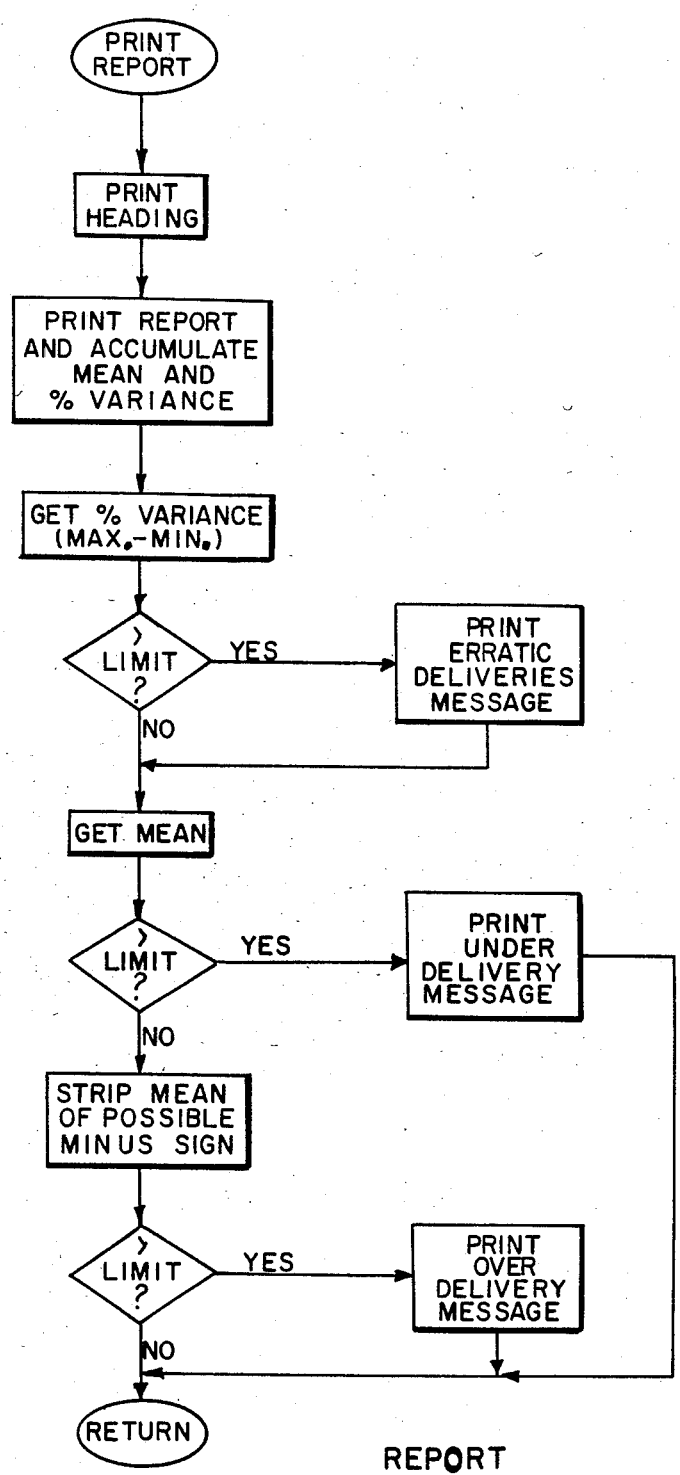
FIG. 6 is an illustrative flow chart of a subroutine for printing a variance report utilizing the computer of FIG. 2.

The computer is also responsive to a "print report" command received during execution of the main program loop. As shown in FIG. 6, in response to a "print report" command, the computer prints a report heading and a report of the most recent twenty stored variance data sets for each tank. This would typically include the date/time, amount of variance, and percentage of variance for each set of data.

The computer then checks the magnitudes of the percentages of variance for each tank against a preset limit. If this limit is exceeded for a tank, the computer prints an "erratic deliveries" message for that tank. The computer then determines the mean of the variances for each tank and compares the mean to a preset limit. If it exceeds this limit, the computer prints an "under delivery" message. If the means does not exceed this limit, the computer removes a minus sign from the mean, if one is present, and compares the result to the limit once again. If the limit is now exceeded, and "over delivery" message is printed. Preferably, during report printing, a dummy read loop is executed at the end of each printed line to keep the dispenser counters updated, etc.

Other computations may be made with the data and additional analyses and messages can be included in the report. For example, a series of substantial stock variances for a tank could be analyzed and identified as a possible leak in a report.

The computer 41 may also be responsive to many additional commands entered through the key pad 44. For example, in the present instance, commands are recognized for printing a list of available commands, setting the present date, setting the present time, printing and displaying the date/time, printing the volume of stock in a particular tank, printing the ullage of a tank, printing a delivery report, or producing a display of stock or ullage.

While the invention has been described in relation to service station operation wherein it is common practice to meter gasoline dispensed *from* the tank, it should be understood that the invention has application to systems in which the liquid is metered as it is dispensed *into* the tank.

Having described my invention, I claim:

1. In a system having a liquid storage tank, and liquid dispensers connected to said storage tank, apparatus for monitoring stock movement to and from said tank comprising:
    a computer;
    means connecting said dispensers to said computer to continuously enter quantities of stock as it is dispensed;
    at least one fixed level indicator mounted within said tank for indicating the true stock level when the stock uppersurface traverses said indicator;
    said computer including means for calculating the level of stock at the time it passes said fixed level indicator, the calculation being based on the quantity of stock added to said tank and subtracted from said tank at the instant the level of stock passes said indicator, means connecting said indicator to said computer to trigger said calculating means; and
    means for comparing the true stock level with a calculated stock level determined to provide a measure of the variance between said true stock level and the calculated level.

2. Apparatus as in claim 1 in which said indicator consists of a prism disposed at a fixed position in said tank, a fiber optic system for transmitting a light beam to one face and for transmitting said light beam from another face when the third face is not covered by liquid.

3. Apparatus as in claim 2 in which the third face of said prism is substantially horizontal but slightly inclined to horizontal so that stock flows immediately from said face as stock is emptied from said tank to a level below said face.

4. Apparatus as in claim 2 further comprising a second prism at the upper level of said tank to signal a full condition of said tank, and a third prism at a low level of said tank to signal a substantially empty condition.

5. Apparatus as in claim 1 further comprising at least one additional fixed level indicator positioned at a different level from said first named indicator;
    and means connecting said additional indicator to said computer for an additional comparison of true stock level to calculate stock level.

6. The method of monitoring liquid stock having a level in a storage tank comprising the steps of:
    setting a premeasured level of stock at a fixed point in said tank;
    adding stock to said tank and dispensing stock from said tank from time to time;
    measuring the quantity of stock added to and dispensed from said tank;
    noting the instant of time that the level of the stock passes said fixed point;
    calculating the level of stock at the time it passes said fixed point, the calculation being based on the quantity of stock added to said tank and subtracted from said tank at the instant said level of stock passes said fixed point, said calculation being triggered when the level of the liquid passes said fixed point;
    and comparing the premeasured level with said calculated level to determine the variance between the premeasured level and the calculated level.

7. The method as in claim 6 further comprising the steps of repeating said comparisons to provide data for determining trends.

* * * * *